Figure 1:
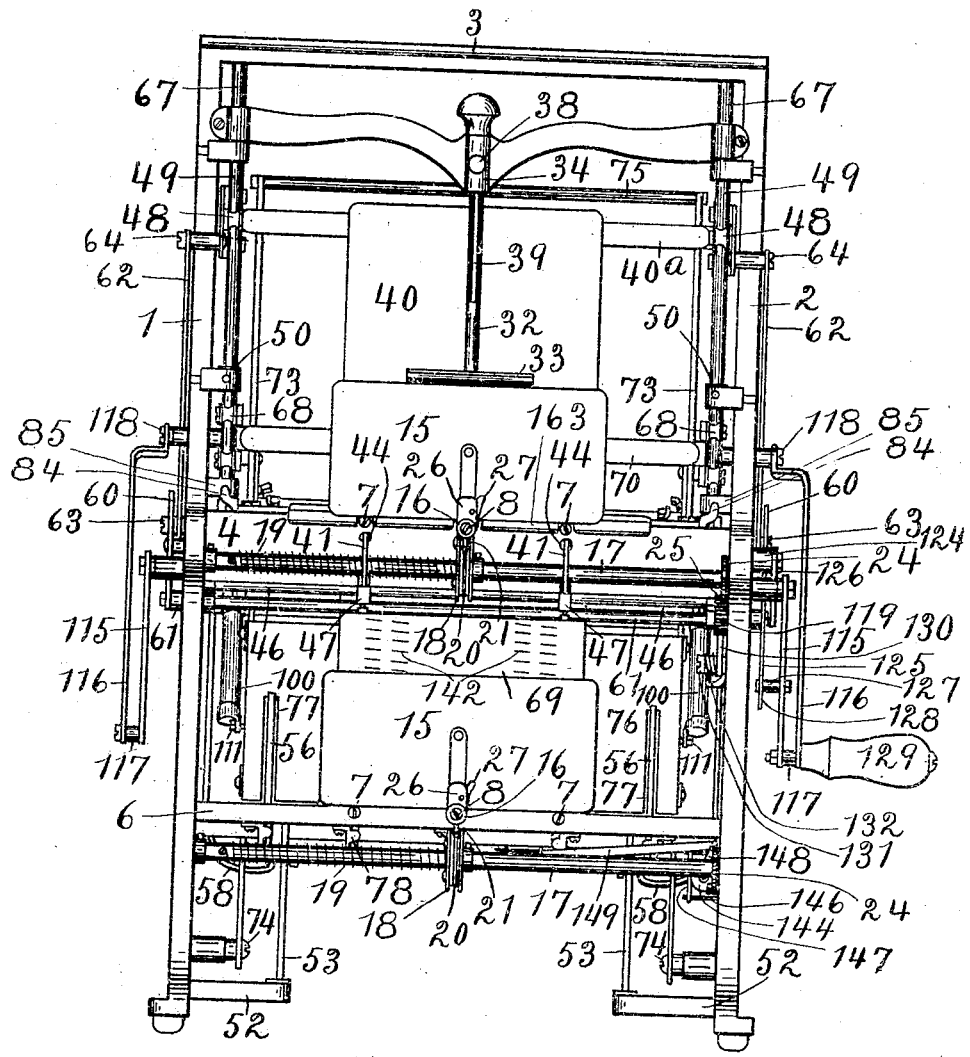

No. 884,081. PATENTED APR. 7, 1908.
C. J. FANCHER & H. S. PARMELEE.
ENVELOP SEALING MACHINE.
APPLICATION FILED DEC. 21, 1906.

7 SHEETS—SHEET 1.

Witnesses
A. C. Fairbanks,
J. M. Stern

Inventors
Charles J. Fancher,
Hubert S. Parmelee,
by Webster & Co.
Attorneys

No. 884,081. PATENTED APR. 7, 1908.
C. J. FANCHER & H. S. PARMELEE.
ENVELOP SEALING MACHINE.
APPLICATION FILED DEC. 21, 1906.

7 SHEETS—SHEET 3

Witnesses
A. C. Fairbanks
J. M. Sterns

Inventors
Charles J. Fancher.
Hubert S. Parmelee.
by Webster & Co.,
Attorneys

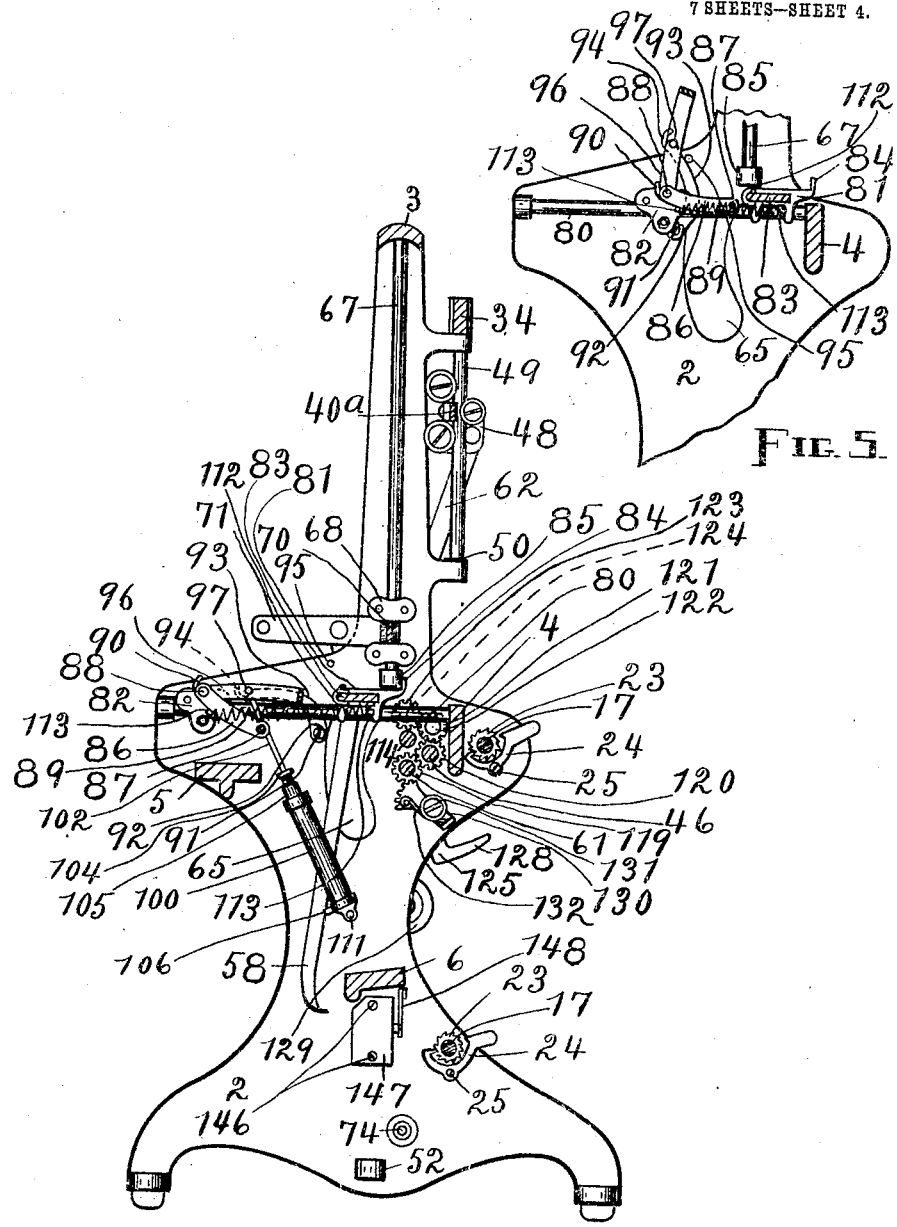

No. 884,081. PATENTED APR. 7, 1908.
C. J. FANCHER & H. S. PARMELEE.
ENVELOP SEALING MACHINE.
APPLICATION FILED DEC. 21, 1906.
7 SHEETS—SHEET 5.
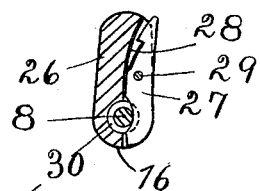
FIG. 6.
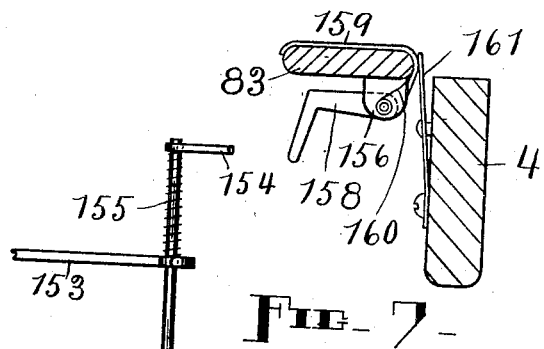
FIG. 7.
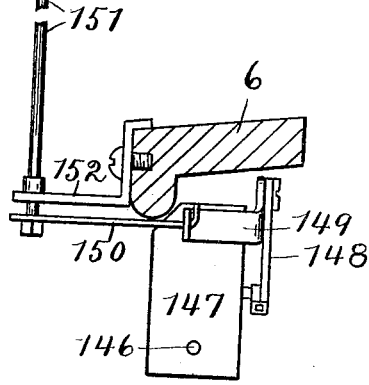
Witnesses
A. C. Fairbanks.
J. M. Stevens.
Inventors
Charles J. Fancher,
Hubert S. Parmelee,
by Webster & Co.
Attorneys.

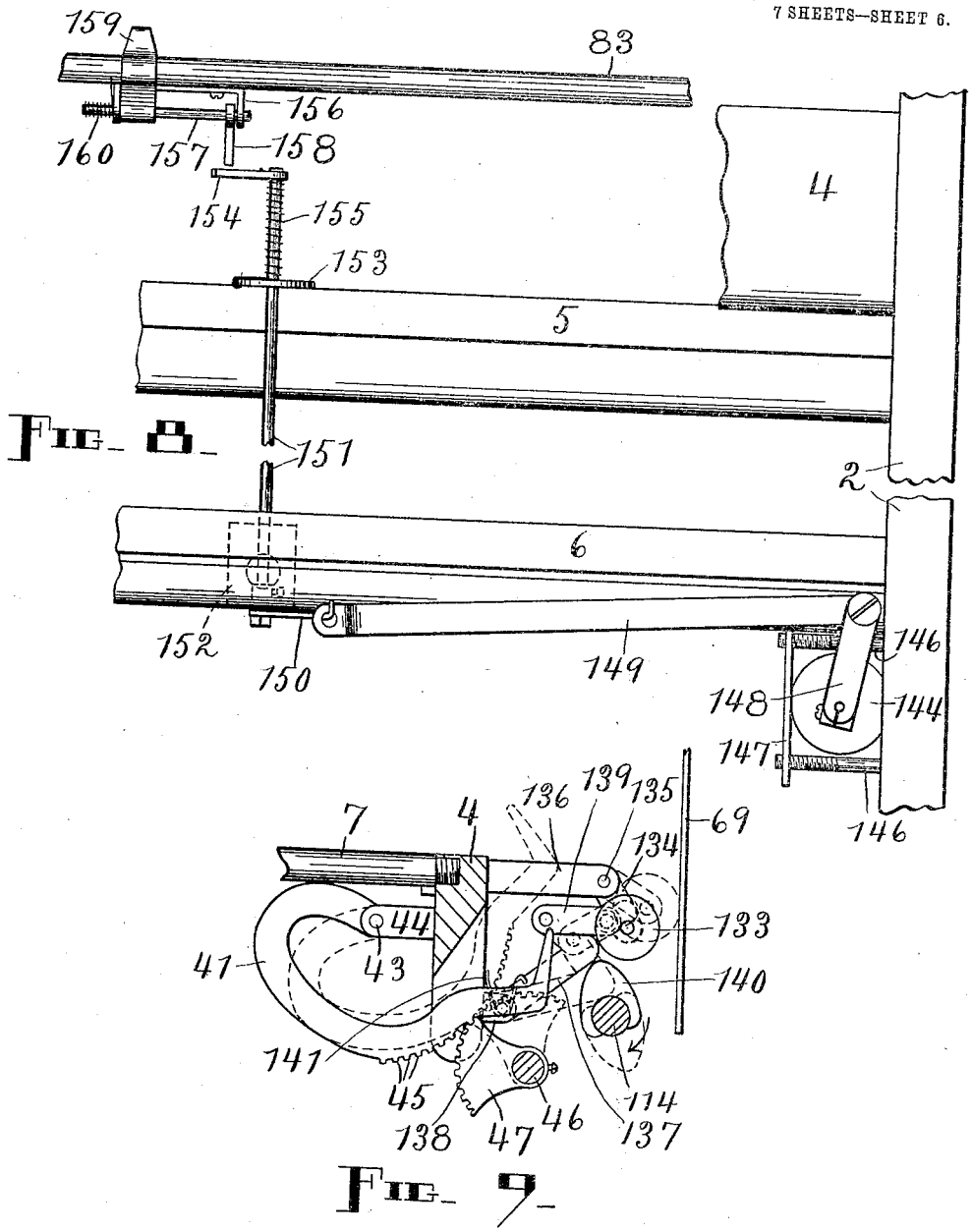

No. 884,081.  
PATENTED APR. 7, 1908.  
C. J. FANCHER & H. S. PARMELEE.  
ENVELOP SEALING MACHINE.  
APPLICATION FILED DEC. 21, 1906.

7 SHEETS—SHEET 7.

Witnesses  
A. C. Fairbanks  
J. M. Sterns

Inventors  
Charles J. Fancher,  
Hubert S. Parmelee,  
by Webster & Co.,  
Attorneys

UNITED STATES PATENT OFFICE.

CHARLES JAMES FANCHER AND HUBERT SYLVESTER PARMELEE, OF WEST GRANBY, CONNECTICUT, ASSIGNORS TO THE SIMPLEX MANUFACTURING COMPANY, OF NEW YORK, N. Y., A CORPORATION OF CONNECTICUT.

ENVELOP-SEALING MACHINE.

No. 884,081.        Specification of Letters Patent.        Patented April 7, 1908.

Application filed December 21, 1906. Serial No. 348,919.

*To all whom it may concern:*

Be it known that we, CHARLES J. FANCHER and HUBERT S. PARMELEE, both citizens of the United States of America, and residents of West Granby, in the county of Hartford and State of Connecticut, have invented a new and useful Envelop-Sealing Machine, of which the following is a specification.

Our invention relates to improvements in automatic machines for sealing envelops, and more particularly to the kind of machine covered by United States Letters Patent, No. 812,236, issued to us February 13th, 1906, and consists in new and improved features of construction in the different parts, combinations of parts and mechanisms throughout the machine, and in the addition of a counting device for the envelops sealed by the machine, and in other additions, all as hereinafter set forth.

Although in general construction and operation the new machine is very similar to the old one, the numerous structural differences and additions render them dissimilar in many respects, add novelty to the new machine, and greatly enhance the efficiency and value of the same.

The objects of our invention are, first, to produce a compact, easily operated or light-running, and comparatively noiseless machine, which is capable of handling to advantage and securely sealing envelops of almost any size and bulk; second, to provide such a machine with improved means for confining the unsealed envelops on the upper level, for removing them one at a time from such level and transferring them to the lower level, and for sealing and confining them at or on such lower level; third, to provide improved mechanism for operating the wiper which applies moisture to the envelop flaps during the transfer from one level to the other; fourth, to provide means for counting the envelops as they pass through the machine, and, fifth, to embody in an envelop-sealing machine all the necessary and advantageous elements needed to make the same practicable and efficient and adequately adapted for the use for which it is intended.

We attain these objects by the means and mechanism illustrated in the accompanying drawings, in which—

Figure 2:
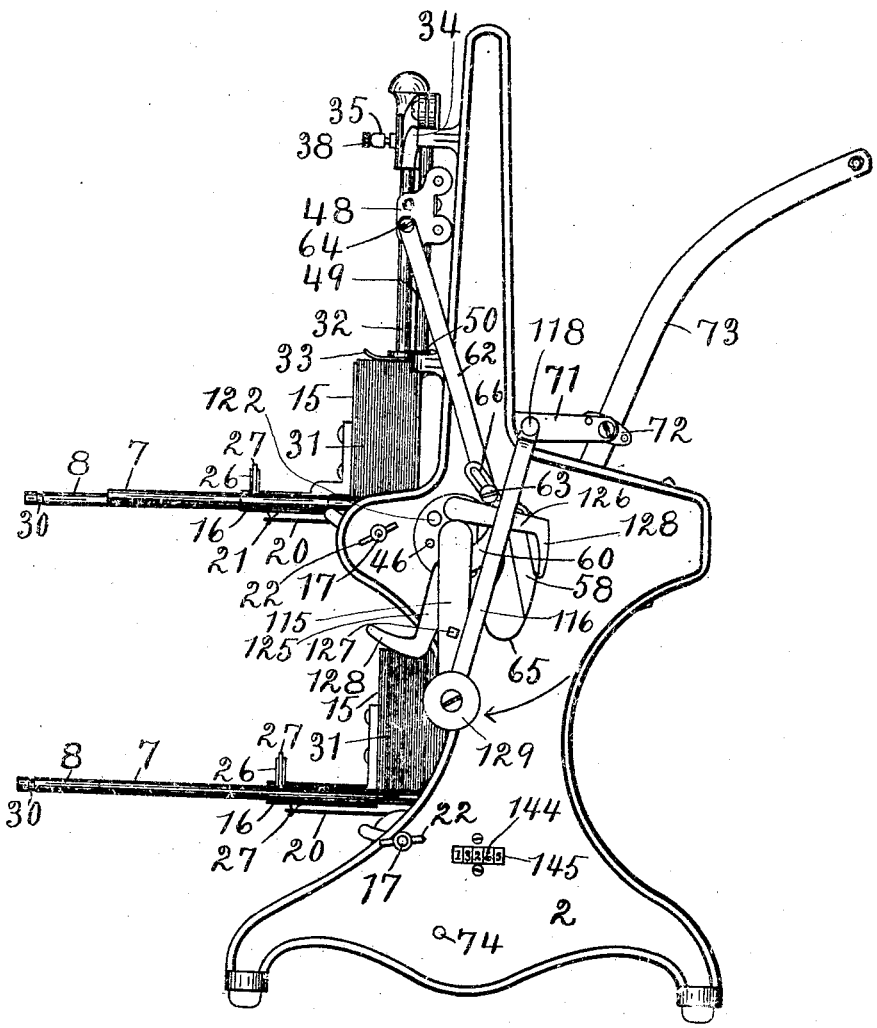
Figure 3:
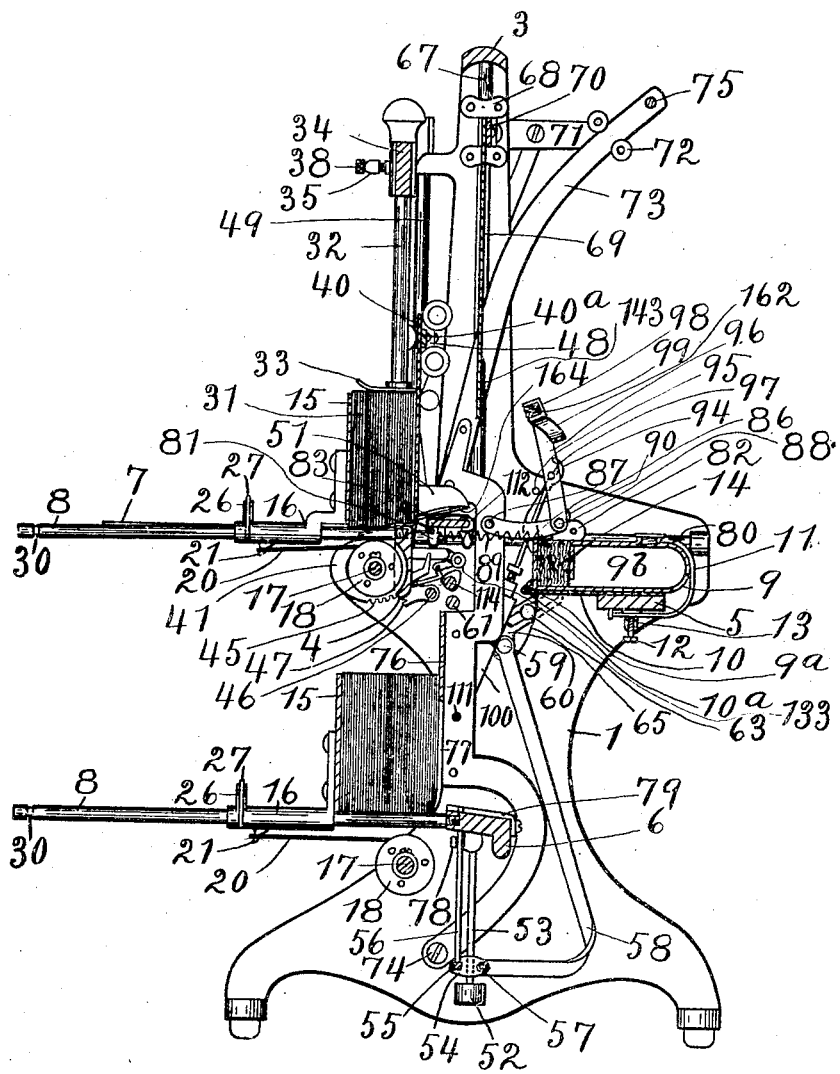
Figure 10:
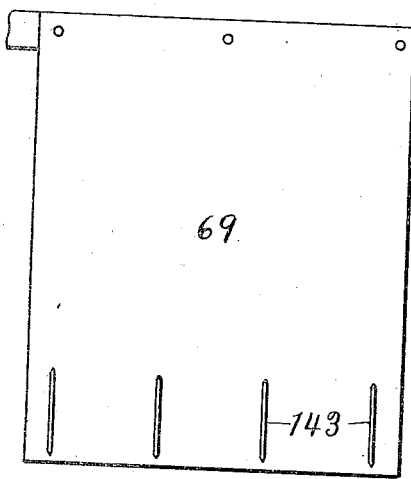
Figure 11:
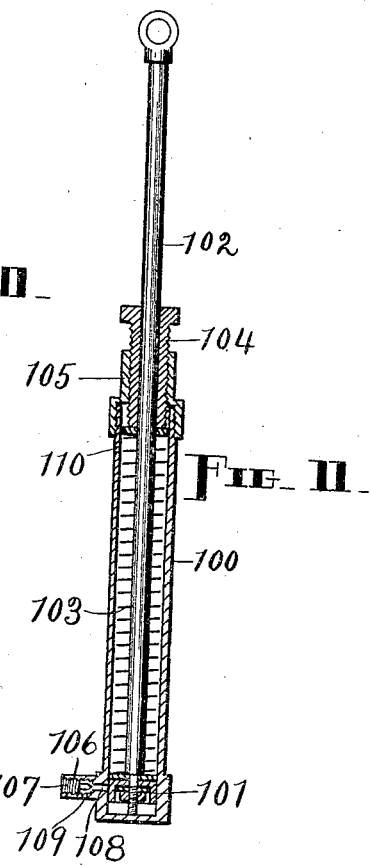
Figure 12:
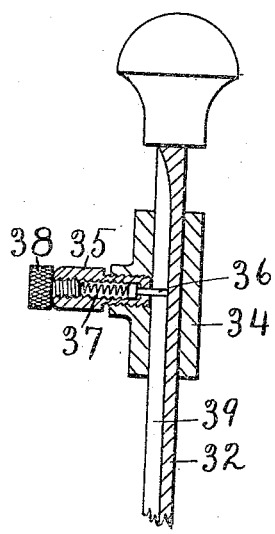
Figure 13:
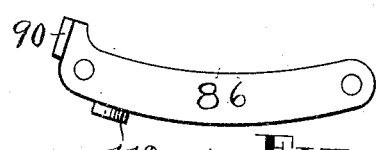
Figure 14:
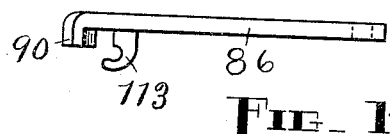

Figure 1 is a front view of the machine; Fig. 2, a side elevation of such machine, with envelops on both supports; Fig. 3, a vertical section of said machine, looking toward the left-hand side, with envelops on both supports as in the preceding view; Fig. 4, a vertical section taken close to the right-hand side of the machine; Fig. 5, a detail view of a part of the wiper-actuating mechanism, showing the same differently disposed from the way it appears in Fig. 4; Fig. 6, an enlarged sectional view of one of the follower detents; Fig. 7, an enlarged side view of the counting mechanism; Fig. 8, an enlarged front view of said mechanism; Fig. 9, an enlarged side view of one of the envelop-stop and -releasing fingers and operating mechanism therefor, and of one of the envelop-depressor or abutment rollers and operating mechanism therefor, the inactive or inoperative positions of the finger and roller being shown in full lines and the active or operative positions in dotted lines; Fig. 10, an enlarged view of the back side of the depressor-plate; Fig. 11, an enlarged longitudinal section of one of the pneumatic devices which forms part of the wiper mechanism; Fig. 12, an enlarged vertical section of the upper portion of the device which prevents the rearmost envelops from becoming displaced upward when the flap-opening plate rises; Fig. 13, an enlarged side view of one of the connecting links in the wiper mechanism, and Fig. 14, an enlarged plan view of the same.

Similar figures refer to similar parts throughout the several views.

The frame of the machine illustrated in the drawings consists of suitable standards, uprights or sides 1 and 2 connected by cross-pieces 3, 4, 5 and 6 of proper shape and rightly located. The upper or delivery platform or support for the unsealed envelops in this case consists of two side rods 7 and a longer middle rod 8 all having their rear ends screwed into the cross-piece 4, and a lower or receiving platform or support for the sealed envelops is similarly made up the rods here having their rear ends screwed into the cross-piece 6. A water-tank or reservoir 9 is removably supported by the cross-piece 5 and a horizontal plate 10 fastened to said cross-piece, a clip 11 and set-screw 12 being employed to hold said reservoir in place. One end of the clip 11 passes through a lug 13 underneath the cross-piece 5 and the set-screw 12 enters into threaded engagement with said lug from below and is adapted to bear against the clip. Upon loosening the set-screw 12 and drawing back the clip and turning its upper terminal to one side the reservoir can readily be removed. In the front part of the reservoir is a mass 14 of absorbent material, as felt, such material being exposed through an opening in the top of the reservoir. The front edge of the plate 10 is turned up, as shown at 10ª in Fig. 3, to receive a pointed projection 9ª at the lower front corner of each side 9ᵇ of the reservoir 9. The projections 9ª, when beneath the upturned edge 10ª of the plate 10, assist the clip 11 in securely holding the reservoir in place.

Mounted on the rods which constitute the upper and lower envelop supports are two followers for the envelops, each consisting of a vertical plate 15 at the rear end of a sleeve 16, together with yielding means to actuate such sleeve with its plate backward. The sleeves 16 are mounted to slide on the middle rods 8. The yielding actuating means or tension device for each follower consists of a shaft 17 journaled between the sides 1 and 2, a winding-sheave 18 loosely mounted on such shaft, a spring 19 having one end fastened to said shaft and the other end to said winding-sheave, a cord 20 having one end fastened to the winding-sheave and the other end to a lug 21 on the bottom of the corresponding sleeve 16, and means to wind up said spring and keep it under proper tension. The winding, holding and releasing means for each of the springs 19 consists of a thumb-nut 22 on each shaft 17 outside of the side 2 of the frame, a ratchet-wheel 23 on such shaft inside of the frame, and a double locking pawl or detent which forms an escapement pawl 24 pivoted at 25 to the inside face of said side 2 and engaging the associated ratchet-wheel. At the front end of each sleeve 16 is an upright lug 26 recessed to receive a latch 27 and a spring 28, the former being pivoted at 29 to said lug as shown in Fig. 6. Each latch 27 is adapted to automatically enter a groove 30 in each rod 8 near its front end when the sleeve 16 with which said latch is connected is drawn forward, and thus it retains said sleeve in its extreme forward position until released by pressing the upper projecting part of the latch inward to disengage the lower part thereof from the sides of said groove, the latch being rocked on its pivot against the resiliency of its spring to bring about such disengagement.

The followers are brought under the required tension by revolving the shafts 17, through the medium of the thumb-nuts 22, to wind up the springs 19, the ratchet-wheels 23 clicking past the pawls 24 during the winding up of the springs without offering any resistance. The escapement pawls 24 prevent the shafts 17 from being rotated by the springs 19, except when said pawls are oscillated or rocked back and forth on their pivots 25 to impart a step-by-step movement to said shafts for the purpose of relaxing the springs when they are wound too tightly, or to permit them to unwind completely in case repairs are necessary or for any other reason. While the springs 19 are being wound it is best to have the followers held in their extreme forward position by the latches 27. After the springs have been wound they tend constantly to rotate the winding-sheaves 18 in the proper direction to take up the cords 20 and thus draw back the followers. The upper follower serves to press the envelops on the upper support backward, so that one envelop after another can be removed therefrom, and the lower follower serves to press the envelops together as they are deposited on the lower support to insure the thorough sticking of the flaps to the backs of the envelops. In practice the upper follower is drawn forward and either locked into place with its latch or not, as desired, and a package of envelops 31 is placed on the upper support rods 7 and 8, then said follower is permitted to be forcibly brought into contact with said package by means of the spring-actuated rotary tension device described above. The envelops are held between the follower and other members presently to be described, and said follower moves backward under the influence of the aforesaid tension device until the last envelop has been removed from the package, after which the follower must be drawn forward again to permit more envelops to be placed on the upper support. The top of the cross-piece 4 forms part of the upper support, and the backward movement of the corresponding follower is limited by said cross-piece, in the absence of any envelops on said support, since the follower sleeve 16 then encounters the cross-piece. The cross-piece 6 limits the backward movement of the lower follower which is left in contact therewith at the beginning of the operation of the machine, but is forced forward against the tension of the lower spring 19 as the envelops are fed onto the lower support. When it is desired to remove the sealed envelops from the lower support the lower follower is drawn forward and may be locked in place by means of its latch 27, after which said follower is released and permitted to move back until checked by the cross-piece 6.

To prevent the first few envelops at the back of the package on the upper support from being forced upward during the operation of the machine, a vertical rod 32 is employed, such rod having a horizontal plate or foot-piece 33 at the bottom and being slidingly mounted in a cross-bar 34 on the front of the frame. Projecting forward from this cross-bar is a nipple 35 within which are a loose pin 36 and a spring 37 held in place by a screw 38 tapped into the front end of said nipple, Fig. 12. The inner end of the pin 36 engages a longitudinal groove 39 in the rod 32. The spring 37 is between the head of this screw 38 and the adjacent end of this screw 38 and presses said pin against the back side of the groove 39, the amount of pressure being made greater or less by adjusting said screw in or out. The office of the spring-pressed pin is, not only to prevent the rod 32 from turning, but also to create sufficient friction to hold said rod wherever it may be left after being moved to the proper height to retain the envelops on the support below.

The unsealed envelops, placed on the upper support with their flaps down and toward the rear, are pressed by their follower against a vertically reciprocating stop and flap opening plate 40 and two fingers 41, with these latter however said envelops are not always in contact since they are intermittently operated to rise back of the package 31 at or near the bottom and to recede from such position. One of these stop fingers with its actuating mechanism is clearly illustrated in Fig. 9 and will next be described. The finger 41 is curved in the peculiar manner shown, has the end of its front curved terminal pivoted at 43 to a lug 44 on the front of the cross-piece 4, is provided with teeth 45 on the lower edge, and turns up at the back to form a hook-like extension or finger proper which is adapted to come up behind the package 31 and engage the same a little above the bottom edge thereof. A shaft 46 journaled in the sides of the frame carries a segment-gear 47 which meshes with the teeth 45 and when oscillated causes the finger 41 to rise into operative position and then to recede from such position. The stop fingers become useful when the plate 40 rises, as will be explained further on in this specification.

The vertical stop-plate and flap-opener 40, which hangs from a carrier-bar 40ª, is located in line with the rear edge of the upper support, or substantially so. The carrier-bar 40ª is provided at the ends with slides 48—48 mounted to reciprocate vertically on guide rods 49—49 fixed in suitable lugs on the front edges of the sides 1 and 2. The aforesaid slides and other similar slides in the machine are provided with anti-friction rollers and are constructed and operated in the usual and well-known manner.

50—50 represent yielding buffers on the rods 49 which prevent shock when the slides 48 and the plate 40 descend. The plate 40 has a flap-opening beak 51 on the back at the bottom. Some portion of the plate 40 is always in front of the package of unsealed envelops, so that said plate acts as a stop, and it also serves to open the envelop flaps.

Supported by lugs 52—52 on the inside of the frame sides and by the cross-piece 6 are two guide rods 53 for a like number of slides 54 at the ends of a carrier-bar 55. Stop-pins 56 rise from the carrier-bar 55 and are adapted to reciprocate vertically through holes in the cross-piece 6. The back end of each slide 54 is pivotally connected at 57 to an actuating bar 58. The upper end of each bar 58 is pivotally connected at 59 with a curved crank-arm 60 mounted on a shaft 61 journaled in the sides 1 and 2, and the base of an actuating bar 62 for one of the slides 48 is also pivotally connected with said crank-arm at 63, the upper end of said bar 62 being pivoted at 64 to the slide. Each pivotal connection 59 passes through a slot 65 in the corresponding frame side. The connection between the carrier-bar 55 and the plate 40 is such that they must both rise and fall together, so that when said plate is elevated the pins 56 are raised in front of the lower follower or of the interposed envelops, and when the plate is depressed said pins are withdrawn from such position. We make provision for adjustment between the bar 62 and the crank-arm 60 by slotting the latter at 66 and forming the pivotal connection through this slot, but such provision is not always necessary and when not resorted to the two members can be pivoted together in the usual way. The central line of the slot 66 should be an arc of a circle having a radius equal to the distance between the two pivotal centers of the bar 62, and then the limit of downward travel of the plate 40 can be fixed at a higher or lower plane by changing the point 63, while the limit of upward travel always remains the same.

Within the frame are two vertical guide-rods 67 supported at the upper end by the cross-piece 3 and at the bottom by suitable lugs on the sides 1 and 2. Vertically reciprocating slides 68—68 are mounted on the guide-rods 67, and a depressor plate 69 depends from a carrier-bar 70 extending between said slides. Each slide 68 is provided with a rearwardly-extending arm 71 having a pivotally attached slide 72 at its back end. Two oscillating arms 73 are pivoted at 74—74 inside of the frame to the sides 1 and 2 or to suitable lugs thereon and are connected at the top by a rod 75. The anti-friction rollers in the slides 72 engage the edges of the upper portions of the arms 73, and the shape of the arms or of said upper portions is such that said arms will be oscillated when said slides move up and down, the upward movement of the slides actuating the arms forward and the downward movement actuating them rearward. A presser-plate 76 extends between and connects the arms 73, such plate being slotted at 77 to accommodate the pins 56. The presser-plate 76 is designed to press the envelops against the lower follower to insure the sticking of the flaps, and to move the package on the lower support far enough forward to enable the pins 56 to come up behind the envelop last deposited on said support. Anti-friction bearings 78, fastened to the underside of the cross-piece 6, are provided for the pins 56. The envelops descend onto the cross-piece 6 upon which, in order to protect them from any dust or dirt which might collect on said cross-piece, two or more straps may be placed to receive the envelops, one such strap being shown at 79 in Fig. 3. The presser-plate 76 in its forward movement sweeps the envelops from the straps onto the lower support.

Inside of each frame upright a horizontal rod 80 is supported between the cross-piece 4 and a suitable lug on the corresponding upright, as is best shown in Figs. 4 and 5, and two slides 81 and 82 are mounted to reciprocate on said rod. The slides 81 are connected by a horizontal wiper-support 83 extending across the machine approximately on a level with the upper envelop support. The rearward movement of the wiper support 83 is limited by ears 84 on the front ends of the slides 81 which encounter the supporting lugs 85 for the bottoms of the guide-rods 67. Each slide 82 is connected with the adjacent arm 73 by a link 86 having one end pivoted at 87 to said arm and the other end pivoted at 88 to said slide. A spring 89 extends between the link 86 and the slide 81 on each side of the machine. At the back end of each link 86 is an ear 90. Pivoted at 91 to each side of the frame on the inside and tensioned upward by a spring 92 is a lifter 93 terminating at the back in a hook 94. A stop pin 95 extends inward from each side of the frame into the path of the corresponding lifter 93. The rear ends of a wiper frame 96 are pivoted at 88 to the slides 82 with the links 86. A pin 97 projects outward from each side of the frame 96 over the adjacent lifter 93, and serves both as an engaging means between the frame and lifter and as a point of attachment for a device which affords both a tension and a cushion for the wiper, such device being described in the paragraph below. The wiper proper, which moistens the flaps of the envelops, consists of two inverted troughs 98 firmly attached to the front cross-bar of the frame 96, such troughs being filled with masses 99 of absorbent material, as felt. The two sections of the actual wiper are separated sufficiently to clear the beak 51 when brought into the vicinity of the same, and the cross-bar of the frame 96 is so bent as to also clear said beak. The parts are so arranged that the masses 99 contact with the mass 14 in the reservoir 9 and with the wiper support 83 or the gummed side of an envelop flap thereon during each cycle of the machine.

In order to produce the required amount of tension on the wiper and at the same time prevent said wiper from operating with a shock and from making too much noise, we provide a pneumatic regulator at each side of the machine, with which or in which a spring is employed as well as air. Referring more particularly to Fig. 11, it will be seen that this regulator comprises a tube 100, a piston 101, a piston-rod 102, and a spring 103. The piston-rod 102 reciprocates through a plug 104 screwed into a cap 105 on the tube 100. The spring 103 encircles the piston-rod between the plug 104 and the piston 101. By changing the position of the plug the tension on the spring will be increased or decreased accordingly as said plug is screwed in or out. At the bottom of the tube is a nipple 106 screwed into which is a plug 107 adapted to regulate the escape of air from said tube through a passage 108 leading from the interior of the tube into said nipple and a perforation 109 in one side of the nipple. The piston descends under the influence of the spring more rapidly when the plug 107 is screwed outward, which permits a larger volume of air to escape than when said plug is screwed inward so as to reduce such volume. When the piston is raised the air above it escapes from the tube through a vent hole 110 in the side of said tube, and the air which is to serve as a cushion for the piston when it descends again enters through the perforation 109 and the passage 108. Suitable packing is provided. The base of each tube 100 is pivoted at 111 to the outside face of the associated arm 73, and the piston-rod 102 in such tube has its upper projecting terminal pivoted to the corresponding pin 97 on the wiper frame.

The wiper-actuating mechanism operates as follows, assuming that the parts stand as shown in Fig. 4: The forward movement of the arms 73 moves the slides 82 in the same direction, through the medium of the links 86, said slides carry with them the frame 96, and, owing to the fact that the pins 97 are now so engaged with the lifter hooks 94 as to force the lifters 93 upward on their pivots 91, said frame is caused to rise by said lifters, the piston-rods 102 being drawn further out of the tubes 100 against the resiliency of the springs 103. The wiper is thus raised from the moist mass in the reservoir and poised ready to descend onto the wiper-support 83 at the proper time. As the arms 73 continue to move forward they encounter the back edge of the wiper-support and they carry said wiper-support with them until it is positioned beneath the beak 51, as shown in Fig. 3, buffers 112 of leather or other suitable material being provided on the aforesaid edge of the wiper-support to receive said arms and lessen the shock of contact between the arms and the wiper-support. When the lifters 93 reach the stop pins 95 further movement in the direction in which they have been going ceases, and the pins 97 are forced out of engagement with said lifters by the forwardly moving parts and by the ears 90 on the links 86, which ears contact with the back edges of said frame at the time the lifters contact with the stop pins, see Fig. 5. When, at the end of the forward movement of the arms 73, the wiper becomes disengaged from the lifters, it is brought down forcibly under the influence of the springs 103 onto the wiper-support to moisten the gummed surface of an envelop flap thereon, yet not so forcibly as to create too much of a jar or to make a very perceptible noise since the air in the tubes 100 between the pistons 101 and the bottoms of the tubes at this time is unable to escape quickly enough through the passages 108 and the perforations 109 to avoid being compressed, wherefore such air acts as a cushion for the pistons near the end of their downward stroke and the wiper is thereby caused to come into contact with the wiper-support without undue shock.

Upon the return or rearward sweep of the arms 73, the wiper and the wiper-support are carried backward with the former resting on the latter, through the medium of the links 86, slides 82 and 81 and springs 89, until the ears 84 encounter the lugs 85 when said wiper-support stops and the wiper is dragged therefrom onto the reservoir mass 14 to receive more moisture for another envelop flap at the next cycle of the machine. During the backward movement of the frame 96, which is then in a substantially horizontal position, the pins 97 strike the lifters, press them down against the resiliency of the springs 92, and ride over them into engagement again with the hooks 94. It will be understood, of course, that the wiper regulators travel back and forth with the arms 73 and the wiper frame, and are made operative by reason of their pivotal connections with such members. As a convenient means of attachment on the links 86 and the slides 81 for the springs 89, each link may be provided with a horn 113, best shown in Figs. 13 and 14, and each slide with a similar horn.

The driving or actuating mechanism of the machine will next be described, particular reference being had in this connection to Figs. 1, 2 and 4. A shaft 114 is journaled in the sides 1 and 2, below the plane of the upper envelop support and above the shaft 61, and crank-arms 115—115 fast on the outer ends of said shaft are connected by links 116—116 with the depressor-arms 71, each of such links being pivoted at 117 to the associated crank-arm and at 118 to the associated depressor-arm. A pinion 119 is tightly mounted on the shaft 61 inside of the upright 2 on the working side of the machine, and a pinion 120, mounted on the shaft 46, meshes with said pinion 119. Meshing with the pinion 120 is a pinion 121 on a stud 122 above the shaft 46, and still another pinion 123 meshes with the pinion 121, a stud 124 above and behind the stud 122 being provided for said pinion 123. The pinion 123 is tight on the stud 124. The crank-arm 60 is continued to form a trip-arm 125, and a trip-arm 126 is fast on the outer end of the stud 124. Both of said trip-arms are long enough to extend into the path of a pin 127 projecting from the inside of the associated crank-arm 115, and the trip-arms are provided at their outer or free terminals with feet 128 having curved outer bearing edges for said pin so that the latter can ride over and off of the same without shock or jar or any tendency to backlash, as would be the case in the absence of such feet. A handle 129, by means of which the machine is manually operated, is attached to the pivot 127 on the working side of the machine. The action of the above described parts will be hereinafter briefly explained.

As a means to steady the action of the train of actuating pinions, we make use of a toothed segment 130 mounted on a stud 131 inside of the upright 2, such segment being constantly under tension of a suitable spring 132 and having its teeth in mesh with the pinion 119. This device puts a tension on the pinions, more when the mechanism acts to draw down the stop fingers 41 through the medium of the intermeshing pinions 119 and 120, at which time the segment 130 is turned to the right from the position which it occupies in Fig. 4, than when said mechanism acts to raise said fingers, and prevents backlash.

Coöperating with the depressor-plate are two rollers designed to assist said depressor-plate to properly transfer the envelops, after their flaps have been moistened, from the upper to the lower level, and mechanism for throwing such rollers into and out of contact with the depressor-plate. Referring again to Fig. 9, where one of these rollers, which may be termed abutment rollers, is shown at 133, it will be seen that the actuating mechanism whereby the same is alternately pressed against the depressor-plate 69 and removed from such position comprises a short arm 134 pivoted at 135 to a lug 136 projecting rearward from the cross-piece 4, and having said roller mounted at the end opposite the pivot 135, a longer arm 137 having a bend or elbow and pivoted at its front end to a short lug 138 projecting from said cross-piece below said lug 136, a link 139 in pivotal connection with both of said arms, a cam 140 on the shaft 114, and a spring 141 arranged to retain said arm 137 in contact with said cam or its shaft except when an envelop between the roller and the depressor-plate prevents such contact. This mechanism operates as follows: When the cam 140 rises beneath the arm 137 the latter is moved upward against the resiliency of the spring 141, draws forward the link 139 with the arm 134, and causes the roller 133 to move away from the depressor-plate 69, which is down at this time, so that an envelop confined between said roller and depressor-plate is released and permitted to drop onto the crosspiece 6; and when the cam passes from beneath the arm 137 the spring 141 acts to reverse the movements of the roller-actuating members so that the roller is thrust against the depressor-plate or the envelop carried downward thereby. These abutment rollers assist the depressor-plate in keeping the envelops straight during their transfer from the upper to the lower support and make the action of the depressor-plate more positive.

The front surface of the depressor-plate 69 may be abraded, roughened or scored, as shown at 142 in Fig. 1, where said depressor-plate in the absence of an envelop comes into contact with the rollers 133, in order to hold an interposed envelop more firmly and prevent the same from slipping. We prefer also to provide the depressor-plate with vertical ribs 143 on the back near the bottom edge, so as to obviate any liability of adhering to said depressor-plate on the part of the moistened envelop flap. These ribs are best shown in Fig. 10. Any other suitable means beside the ribs 143 may be employed for rendering the surface of the depressor-plate with which the moistened gummed surface of the envelop flap contacts uneven, irregular or broken.

Passing finally to the counting device, by means of which an accurate record is made of every envelop that passes through the machine, it will be noticed that we so attach a cyclometer 144, or other suitable counter, on the inside of the upright 2 that its dial shows through an opening 145 in such upright, as will be seen in Fig. 2. The operating mechanism for this counter, whereby the same is caused to register every envelop sealed, but fails to work while the machine although in motion is not transferring envelops from one level to the other, is clearly illustrated in Figs. 7 and 8, to which attention is now called. The counter 144, which is held in position by rods 146—146 extending inward from the side 2 and by a plate 147 on the inner ends of said rods, is provided with an operating arm 148 which every time it is oscillated works the interior mechanism and shows a higher number at the opening 145. A bar 149 has one end pivotally attached to the arm 148 and the other end engaged by a hook 150 fast on the lower terminal of a vertical shaft or rod 151. The rod 151 is rotatably mounted in a rearwardly-extending bracket or bearing 152 fastened on the back edge of the cross-piece 6 and in a forwardly-extending bracket or bearing 153 fastened to the top of the cross-piece 5.

Rigidly fastened to the top of the rod 151 is a horizontal finger 154. A spring 155 is attached to the rod 151 and normally holds the same and the connected members in the positions in which they appear in the drawings, and returns them to such positions after each pulsation. Journaled in a bracket 156, on the under side and near the front edge of the wiper-support 83, is a trip for the finger 154, consisting of a short horizontal shaft or rod 157, an angular arm 158 and a lip 159 fast on such arm, and a spring 160. The arm 158 is below the wiper-support and the lip 159 is above said wiper-support, being extended upward and rearwardly into such position. The spring 160 is so arranged in connection with the rod 157 as to normally retain the arm 158 with its elbow against the bottom of the wiper-support and its free end above the horizontal plane and out of the way of the finger 154, and to keep the lip 159 raised above the wiper-support, as shown in Fig. 8. Properly located on the back of the cross-piece 4 in line with the curved front part of the lip 159 is a dog 161.

The operation of the mechanism just described is as follows: The spring 160 causes the trip-arm 158 to be carried above the finger 154 when the wiper-support descends, but at the end of the forward movement of said wiper-support the trip lip 159 strikes the dog 161 and is thereby pressed down flat onto the top of said wiper-support, against the resiliency of said spring, and said arm is at the same time thrown down below the horizontal plane of the finger 154. Now if no envelop flap be turned down onto the wiper-support, by the plate 40 and its beak, to be held by the wiper, which immediately descends, and in turn to itself hold down the lip 159 when the wiper-support travels away from the dog 161, then the trip members will at once respond to the spring and the arm will pass over the finger 154 without touching the same, but in the presence of a flap on the wiper-support the trip members are held down thereby until said arm engages and actuates said finger and thus causes the counter 144 to record the passage of another envelop, through the medium of the rod 151, hook 150, bar 149 and arm 148. These last-mentioned members are actuated to the left by the arm 158 and the finger 154, but as soon as said arm passes by and clears said finger the spring 155 acts to reverse the movement of said members and to restore them to their former position. The lip 159 flies up again under the influence of the trip spring as soon as the envelop flap is removed from between the wiper-support and wiper. The space between the wiper troughs 98 and the U-shaped bend 162 in the cross-bar of the frame 96 receives the lip 159 when the wiper is in operative connection with the wiper-support.

163 is a plate placed over the upper edge of the cross-bar 4 and extending forward onto the upper envelop support rods 7 and 8 to receive the envelops as they are pushed backward by the follower, and such plate really converts the back end of said support into a closed platform.

Although the operations of the improved mechanisms and devices presented herewith have been quite fully explained and the general operation of the machine as a whole is similar to that set forth in detail in our aforesaid patent, a brief description of what takes place at each revolution of the crank-arms 115, as operated by the handle 129, starting from the point where said handle rests and moving in the direction of the arrow in Fig. 2, will be given.

The envelops 31 are first placed on the upper support with their flaps toward the back and at the bottom, then the handle 129 is moved in the direction of the arrow in Fig. 2, with the result that the pin 127 actuates the trip-arm 125 and the crank-arms 60 with the links 62 and the bars 58 cause the plate 40 and the pins 56 to descend, also the stop fingers 41, all before said pin rides off of said trip-arm. At the same time the crank-arms 115 and links 116 raise the depressor-plate 169 and draw inward the arms 73 through the medium of the intervening mechanism. The plate 14 in its descent engages the flap 164, Fig. 3, of the front envelop on the upper support and with the beak 51 presses it downward. The presser-plate 76 has moved forward to engage the envelops on the lower support and hold them in position in lieu of the pins 56, which have descended below the top plane of the straps 79. When the arms 73 rock forward, the wiper is tilted up and poised by the means and in the manner already fully described, the absorbent masses 98 having become moistened by contact with the mass 14 in the reservoir 9, it being understood, of course, that said reservoir contains water. The wiper is now poised in position ready to come down onto the gummed surface of the flap 164, and the wiper-support is in position beneath said flap to receive said wiper. The parts now stand substantially as shown in Fig. 3. As the handle moves on the arms 73 are drawn still further forward and the wiper is forced out of engagement with the hooks 94 and drops onto the flap and wiper-support. At the same time the plate 69 is still further elevated and the plate 76 forced further forward and tightly pressed against the envelops on the lower support to compress them and cause their flaps—those which are not yet dry—to adhere securely to the backs. When the pin 127 contacts with and actuates the trip-arm 126, the latter, through the medium of the train of pinions, commences to cause the shaft 61 to rotate whereby the elevation of the plate 40 and pins 56 and the raising of the fingers 41 are brought about. Before the pin 127 rides off of the trip-arm 126 the plate 40 and the pins 56 have risen to their highest positions. During this time the crank-arms 115 and the links 116 begin to draw down the depressor-plate 69 and through the medium of the arms 73 to move back both the wiper and the wiper-support with the envelop flap grasped between them. The ears 84 and lugs 85 check the wiper-support at the proper time. While the flap of the envelop in transit is in the grasp of the wiper and wiper-support the plate 40 with its beak rises to a position near the top of such envelop, the latter is drawn backward off of the support, and the plate 69 comes down onto said envelop at or near the junction of the flap with the body thereof. This envelop is now held at its upper part between the package under tension from the upper spring 19 on the upper platform and the plate 40 and by the flap, as explained, while the plate 69 is on the point of forcing said envelop out of the grasp of the upper follower.

As the handle 129 passes on to complete the circle which it is describing, the arms 73 are forced clear back and the wiper is drawn off of the wiper-support and onto the absorbent material in the reservoir. The contact of the wiper, under the influence of the springs 103, with the absorbent material in the reservoir tends to thoroughly moisten the absorbent material of the wiper so that it is prepared to moisten the gummed surface of the flap of the next envelop.

The plate 69 has now been depressed into its lowest position, carrying with it the envelop being acted upon. As said plate descends it draws the flap from beneath the wiper before the latter leaves the wiper-support and also drags the envelop free from the force that held it at the top. It is at this time that the abutment rollers 133 come into action, they having been thrown backward and upward into position by means of the mechanism operated by the cams 140 on the shaft 114 and the springs 141 just as the plate 69 commences to act on the envelop, the cams moving from beneath the arms 137 and leaving said arms to the influence of said springs. After the rollers 133 have served their purpose of assisting to guide and steady the envelop carried down by the plate 69, the cams 140 act to throw said rollers out of operative position so as to permit the envelop to drop. The envelop now drops onto the straps 79 on the cross-piece 6 between the presser-plate 76 and the pins 56. The envelop is securely sealed during the next cycle of the mechanism at the time said presser-plate moves into its extreme forward position, and at this time the package and the follower on the lower or receiving support are forced forward against the resiliency of the lower spring 19 and the pins 56 come up in the slots 77 in front of the envelops, between which pins and the lower-follower the envelops are held when said presser-plate moves rearward again.

During each cycle of the machine the counting mechanism operates in whole or in part, accordingly as to whether or not an envelop be grasped between the wiper and wiper-support, in the manner hereinbefore disclosed.

The machine can be operated by power instead of by hand without materially changing the driving mechanism.

What we claim as our invention, and desire to secure by Letters Patent, is—

1. The combination, in an envelop-sealing machine, with a supporting part of the frame of the machine, and a reservoir supported thereby, of a clip adapted to engage said reservoir at the back, and means to fasten said clip to said supporting part.

2. The combination, in an envelop-sealing machine, with the frame of the machine, and a plate supported by said frame and having its front edge turned up, of a reservoir adapted to be mounted on said plate and provided with projections to engage the upturned edge of the plate.

3. The combination, in an envelop-sealing machine, with a cross-piece of the frame of the machine, and a plate attached to said cross-piece and having its front edge turned up, of a reservoir adapted to be mounted on said plate and provided with projections to engage the up-turned edge of the plate, a clip adapted to engage said reservoir at the back, and means to fasten said clip to the cross-piece.

4. The combination, in an envelop-sealing machine, with the frame of the machine, envelop supporting rods on such frame, and an envelop follower comprising a plate and a supporting sleeve therefor, such sleeve being slidingly mounted on one of such rods, of a shaft journaled in said frame, a sheave on such shaft, a cord connecting said follower with said sheave, a winding spring attached to the shaft and sheave, and means to hold the shaft against rotation.

5. The combination, in an envelop-sealing machine, with the frame of the machine, envelop supporting rods on such frame, and an envelop follower comprising a plate and a supporting sleeve therefor, such plate being slidingly mounted on one of such rods, of a shaft journaled in said frame, a sheave mounted on said shaft, a cord connecting said follower with said sheave, a winding spring attached to the shaft and sheave, a ratchet-wheel on the shaft, and a detent for such ratchet-wheel.

6. The combination, in an envelop-sealing machine, with the frame of the machine, an envelop support on such frame, and an envelop follower slidingly mounted on said support, of a shaft journaled in said frame, a sheave mounted on said shaft, a cord connecting said follower with said sheave, a winding spring attached to the shaft and sheave, a ratchet-wheel on the shaft, and an escapement pawl pivoted to the frame in operative relation with said ratchet-wheel.

7. The combination, in an envelop-sealing machine, with a supporting rod, of an envelop follower slidingly mounted on said rod, means to tension said follower in one direction, and means to lock said follower to said rod and hold it against said tension means.

8. The combination, in an envelop-sealing machine, with the frame of the machine, and a supporting rod projecting from said frame and having an engaging part for a latch, of an envelop-follower sleeve slidingly mounted on said rod, and a latch carried by said sleeve, adapted to engage and release said engaging part of the rod.

9. The combination, in an envelop-sealing machine, with the frame of the machine, and a grooved supporting rod projecting from said frame, of an envelop-follower sleeve slidingly mounted on said rod, a lug on said sleeve, and a spring-pressed latch pivotally connected with said lug, said latch being adapted to engage and release the grooved part of the rod.

10. The combination, in an envelop-sealing machine, with a cross-bar of the frame of the machine, of an envelop retainer comprising a rod slidingly mounted in said cross-bar and provided with a foot-piece, and a spring-pressed member arranged in the cross-bar to bear against said rod, for the purpose of holding it with its foot-piece at any possible elevation by frictional engagement.

11. The combination, in an envelop-sealing machine, with a cross-bar of the frame of the machine, of an envelop retainer comprising a longitudinally grooved rod slidingly mounted in said cross-bar and provided with a foot-piece, and a spring-pressed pin arranged in the cross-bar to frictionally engage the grooved part of said rod for the purpose of preventing the same from turning and of holding it with its foot-piece at any possible elevation.

12. The combination, in an envelop-sealing machine, with a cross-bar of the frame of the machine, of an envelop retainer comprising a longitudinally grooved rod slidingly mounted in said cross-bar and provided with foot-piece, a spring-pressed pin arranged in the cross-bar to frictionally engage the grooved part of said rod for the purpose of preventing the same from turning and of holding it with its foot-piece at any possible elevation, and means to vary the tension on said pin.

13. The combination, in an envelop-sealing machine, with an envelop support and a follower thereon, of a reciprocating plate and an oscillating finger, said follower and the latter being below said plate and adapted to rise and fall behind the follower.

14. The combination, in an envelop-sealing machine, with an envelop support and a follower thereon, of a reciprocating plate and an oscillating finger back of said follower, said finger being below said plate, and means to raise said finger into operative position behind the follower when the plate rises and to withdraw the finger from such position when the plate descends.

15. The combination, in an envelop-sealing machine, with an envelop support, of a serrated finger pivotally mounted below said support, a rock-shaft, and a segment-gear mounted on said rock-shaft and meshing with the finger serrations, to actuate said finger.

16. The combination, in an envelop-sealing machine, with an envelop support, of a serrated finger pivotally mounted below said support, a rock-shaft, a segment gear mounted on said rock-shaft and meshing with the finger serrations to actuate said finger and means to intermittently operate the rock-shaft.

17. In an envelop sealing machine, the combination, with an envelop support having a follower thereon, of stop pins adapted to operate behind said follower across the course of the latter, a carrier bar for said pins, slides at the ends of said carrier-bar, guide rods for said slides, and means to reciprocate the slides on said rods.

18. In an envelop-sealing machine, the combination, with a reciprocating stop and flap-opening plate, and supporting and actuating mechanism therefor consisting in part of slides and bars pivotally connected with said slides, of crank-arms slotted to receive the pivots which connect the same to said bars, whereby adjustment is afforded, and means to operate said crank-arms.

19. In an envelop-sealing machine, the combination, with an envelop support having a follower thereon, of stop pins adapted to operate behind said follower across the course of the latter, a carrier-bar for said pins, actuating bars for said pins connected with said carrier-bar and suitably mounted crank-arms in direct pivotal connection with said actuating bars.

20. In an envelop-sealing machine, the combination, of a reciprocating stop and flap-opening plate, actuating bars connected with said plate, stop pins and a carrier bar therefor actuating bars connected with said carrier-bar and suitably mounted crank-arms in direct pivotal connection with both the plate-actuating bars and the carrier-bar-actuating bars.

21. In an envelop-sealing machine, the combination, with a cross-piece of the frame of the machine, and straps on said cross-piece, of means to deposit envelops on said straps, and means to remove said envelops therefrom, the straps serving to prevent the envelops from coming in contact with the cross-piece.

22. In an envelop-sealing machine, an oscillating wiper spring-actuated in one direction, means to actuate said wiper against the resiliency of its spring, and pneumatic means to cushion the wiper when released to such spring.

23. The combination, in an envelop-sealing machine, with suitably supported guide rods, a wiper mounted to reciprocate on said rods, and means to reciprocate such wiper, of pivotally mounted lifters in the path of travel of said wiper adapted to rise when the latter is actuated forward and to engage and elevate the same, and means to cause the wiper to become disengaged from the lifters at or near the end of the forward movement of the wiper.

24. The combination, in an envelop-sealing machine, with suitably supported guide rods, a wiper mounted to reciprocate on said rods, and means to reciprocate such wiper, of pivotally mounted lifters in the path of travel of said wiper adapted to rise when the latter is actuated forward and to engage and elevate the same, and stops arranged to limit the movement of said lifters in one direction and permit the wiper to ride off of the lifters.

25. The combination, in an envelop-sealing machine, with suitably supported guide rods, a wiper mounted to reciprocate on said rods, and means to reciprocate such wiper, of pivotally mounted lifters in the path of travel of said wiper adapted to rise when the latter is actuated forward and to engage and elevate the same, stops arranged to limit the movement of said lifters in one direction whereby the wiper is permitted to ride off of the lifters, and means to tension the lifters toward said stops.

26. The combination, in an envelop-sealing machine, with a reciprocating and oscillating wiper, means to reciprocate such wiper, and resilient means adapted to rock said wiper in one direction, of pivotally mounted lifters so arranged as to be in the path of travel of the wiper when moved either backward or forward and adapted to engage with and be raised by the wiper in its forward movement and in turn to elevate the wiper, and adapted to be depressed by the wiper in its backward movement.

27. The combination, in an envelop-sealing machine, of suitably supported guide rods, a wiper having slides mounted on such rods, a wiper-support having slides also mounted on such rods, resilient connections between the wiper and support, suitably mounted operating arms adapted to bear on said wiper-support and actuate it forward against the force of such resilient connections, and connections between such arms and the wiper slides whereby said slides and wiper move with the arms.

28. The combination, in an envelop-sealing machine, of suitably supported guide rods, a wiper having slides mounted on such rods, a wiper-support having slides also mounted on such rods, resilient connections between the wiper and support, suitably mounted operating arms adapted to bear on said wiper-support and actuate it forward against the force of such resilient connections, pivotal connections between such arms and the wiper slides whereby said slides and the wiper move with the arms, ears on the wiper-support slides, and lugs in the paths of said ears to limit the movement of the wiper-support in the direction of the force of said resilient connections.

29. The combination, in an envelop-sealing machine, with an oscillating wiper, of a tube provided with an air inlet and outlet, a piston in said tube, and a piston-rod therefor connected with said wiper.

30. The combination, in an envelop-sealing machine, with an oscillating wiper, of a tube, a piston in said tube, and a piston-rod therefor connected with said wiper, said tube being provided with air inlets and outlets both sides of said piston.

31. The combination, in an envelop-sealing machine, with an oscillating wiper, of a tube with an air inlet and outlet passage, means to regulate the size of said passage, a piston in said tube, and a piston-rod therefor connected with said wiper.

32. The combination, in an envelop-sealing machine, with a wiper, of a tube provided with an air inlet and outlet, a spring-pressed piston in said tube, a piston-rod therefor connected with said wiper, and means first to actuate the wiper against the resistance offered by said spring-pressed piston and then to release the wiper to the influence of the same.

33. The combination, in an envelop-sealing machine, with a wiper, of a tube provided with an air inlet and outlet, a piston in such tube, a spring also in such tube confined between one end of the same and said piston, a piston-rod for the piston connected with said wiper, and means first to actuate the wiper against the resiliency of said spring and then to release the same to the influence of the spring.

34. The combination in an envelop-sealing machine, with an oscillating wiper, of a tube provided with an air inlet and outlet, a piston in such tube, a spring also in such tube, adjustable means to confine said spring between said piston and one end of the tube, and a piston-rod for the piston connected with said wiper.

35. In an envelop-sealing machine, a reciprocating and oscillating swinging operating arms therefor, and a pneumatic regulator for said wiper, said regulator being connected at one end with one of said arms and at the other end with the wiper.

36. In an envelop-sealing machine, a wiper, suitably mounted operating arms therefor connected therewith, and a pneumatic regulator for said wiper, said regulator consisting in part of a spring-pressed piston, carried by said arms and the wiper.

37. The combination, in an envelop-sealing machine, of a reciprocating wiper, suitably mounted operating arms therefor connected therewith, tubes provided with air inlets and outlets pivotally connected with said arms, spring-pressed pistons in such tubes, piston-rods for said pistons pivotally connected with said wiper, and means first to actuate the wiper against the force of said spring-pressed pistons and then to release the wiper again to such force, as the wiper is reciprocated by the arms.

38. In an envelop-sealing machine, driving mechanism comprising a crank-arm adapted to be revolved in one direction, a projecting member on such crank-arm, a second crank-arm provided with a trip-arm extending into the path of such projecting member, a second trip-arm also extending into the path of said member, and a train of pinions actuated by said trip-arms and arranged to actuate said second crank-arm in the opposite direction to that given it by said first trip-arm, when said second trip-arm is actuated by the projecting member.

39. In an envelop-sealing machine, driving mechanism comprising a crank-arm adapted to revolve in one direction, a projecting member on such crank-arm, a second crank-arm, and two trip-arms and a train of pinions arranged to rotate said second crank-arm in opposite directions, said trip-arms extending into the path of the projecting member on said first-mentioned crank-arm and being provided at their outer ends with feet having curved surfaces for said projecting member to ride on, such feet preventing shock or jar and backlash when the projecting member passes over and off of the trip-arms.

40. In an envelop-sealing machine, the combination, with a train of pinions, and means to actuate said pinions in opposite directions, of a suitably mounted segment-gear meshing with one of such pinions, and a spring arranged to retain said segment-gear under tension.

41. The combination, in an envelop-sealing machine, with a reciprocating depressor-plate, of an abutment roller, movable supporting means for such roller and means so to actuate such supporting means as to move said roller into and out of engagement with said depressor-plate or an envelop engaged thereby.

42. The combination, in an envelop-sealing machine, with a rising and falling depressor-plate, of an abutment roller, movable supporting means for such roller, and means so to actuate such supporting means as to move said roller into engagement with said depressor-plate or an envelop carried thereby while descending and to move such roller out of such engagement at the time the depressor-plate ascends.

43. The combination, in an envelop-sealing machine, with a reciprocating depressor-plate having a roughened, abraded or scored surface, of an abutment roller located adjacent to such surface, movable supporting means for such roller, and means so to actuate such supporting means as to move such roller into and out of engagement with said depressor-plate or an envelop engaged thereby.

44. In an envelop-sealing machine, a reciprocating depressor-plate, an abutment roller adapted to operate in conjunction with said depressor-plate, and actuating mechanism for such roller consisting of a supporting arm for the roller, a spring-pressed arm, a link connecting said arms, and a cam adapted to actuate said second-mentioned arm against its spring.

45. In an envelop-sealing machine, the combination, with a wiper and a wiper-support adapted to grasp an envelop flap and to moisten the gummed surface of such flap, of a depressor-plate adapted to engage the envelop and withdraw its flap from said wiper and wiper-support, such depressor-plate having an uneven, irregular or broken surface where the moistened gummed surface of the flap contacts therewith to prevent such gummed surface from adhering thereto.

46. In an envelop-sealing machine, the combination, with a support for the flap of an envelop, of a counter, and means to operate said counter dependent for action upon the presence of an envelop flap on said support.

47. In an envelop-sealing machine, the combination, with a reciprocating support for the flap of an envelop, of a counter, actuating mechanism for said counter, and means carried by said support for operating such mechanism only when an envelop flap is in position on the support.

48. In an envelop-sealing machine, the combination, with a counter, and actuating mechanism therefor, of a reciprocating support for the flap of an envelop, a spring-pressed trip carried by said support, and a dog arranged to actuate said trip against its spring into operative relation with such mechanism when the support moves in one direction.

49. In an envelop-sealing machine, the combination, with a counter, and actuating mechanism therefor, of a reciprocating support for the flap of an envelop, a spring-pressed trip carried by said support, said trip having a member extending over the support and adapted to be held down by an envelop flap held thereon, a dog arranged to actuate said trip against its spring into operative relation with such mechanism when the support moves in one direction, and means to hold the envelop flap on the support so as to hold down said trip member while the trip operates the counter.

50. In an envelop-sealing machine, the combination, with a reciprocating support for the flap of an envelop, means to retain a flap on said support, and a spring-pressed trip carried by the support and adapted to be retained in a depressed position by such flap, of a counter, a rotary rod spring-actuated in one direction, actuating mechanism between said counter and rod, and a finger on said rod lying in the path of travel of the trip when depressed and capable of rotating the rod against its spring and operating the counter when contacted with by the trip.

51. In an envelop-sealing machine, the combination, with a reciprocating support for the flap of an envelop, means to retain a flap on said support, a spring-pressed trip carried by the support and adapted to be retained in a depressed position by such flap, and a dog arranged to depress said trip against its spring when the support moves in one direction, of a counter, a rotary rod spring-actuated in one direction, actuating mechanism between said counter and rod, and a finger on said rod lying in the path of travel of the trip when depressed and capable of rotating the rod against the spring and operating the counter when contacted with by the trip.

CHARLES JAMES FANCHER.
HUBERT SYLVESTER PARMELEE.

Witnesses:
W. C. PRIOR,
N. H. GRAHAM.